Aug. 21, 1934.  W. L. SPALDING  1,970,923
PROCESS AND APPARATUS FOR THE PRODUCTION OF SULPHUR TRIOXIDE
Filed July 7, 1931
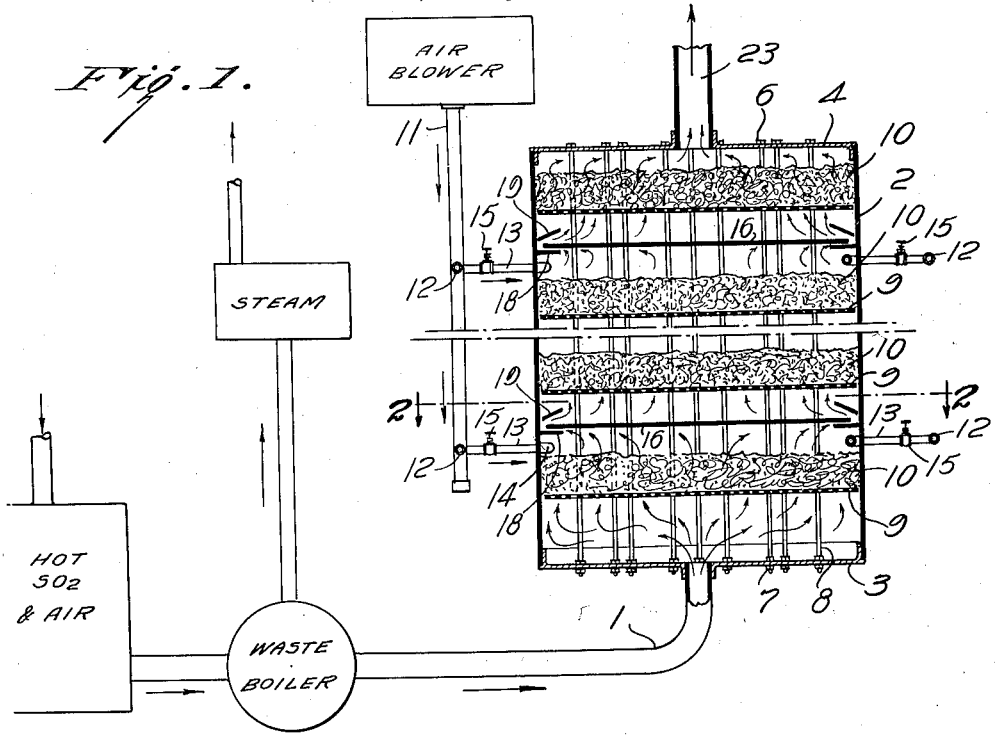
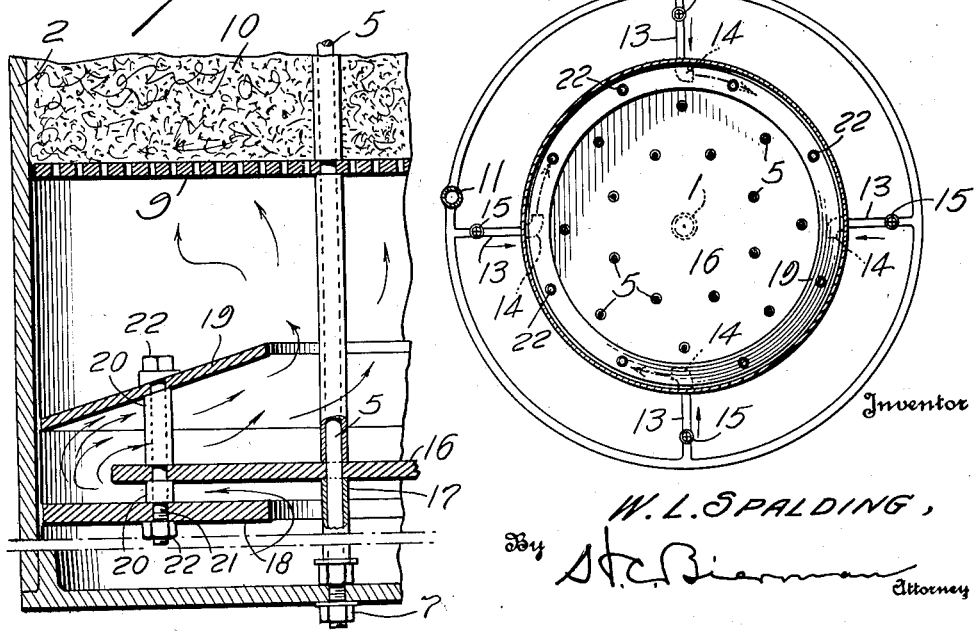

Patented Aug. 21, 1934

1,970,923

UNITED STATES PATENT OFFICE 1,970,923

PROCESS AND APPARATUS FOR THE PRODUCTION OF SULPHUR TRIOXIDE

William L. Spalding, Westfield, N. J., assignor to American Cyanamid Company, New York, N. Y., a corporation of Maine Application July 7, 1931, Serial No. 549,197

11 Claims. (Cl. 23—176)

This present invention relates to a method and apparatus for efficiently and thoroughly mixing or commingling bodies of gases. It has specific application in the manufacture of sulphuric acid by admixing volumes of sulphur dioxide and air, and passage of this mixture through catalytic contact material for the production of sulphur trioxide, which is subsequently converted to $H_2SO_4$. While the invention is particularly applicable to the sulphuric acid art and solves a real problem there, yet obviously it has many other applications and may be used in any circumstances where it is desired to cause efficient and thorough mixing or commingling of at least two bodies of gases, particularly over a large area while traveling a comparatively short forward distance, and where it is desired to redistribute the mixed gases uniformly over this area.

In the manufacture of sulphuric acid by passing sulphur dioxide and air through contact catalytic material, the production of sulphur trioxide by this catalytic reaction develops a considerable amount of heat. Inasmuch as the reaction proceeds most efficiently within a comparatively small temperature range, and this developed heat raises the temperature of the gases to a point outside of this range, it becomes desirable, if the efficiency of the reaction is to be maintained, that these gases be cooled to a point within the efficient reaction range prior to their passage through additional or subsequent catalytic material.

It has been found desirable in the production of sulphuric acid as above set forth to provide an excess amount of oxygen as air or other gas for admixture with sulphur dioxide, over that necessary to theoretically combine with the latter to form sulphur trioxide. If this total excess amount of air is initially added to the sulphur dioxide and the mixture passed through successive masses of contact material, a much less efficient reaction is obtained, than if a minimum excess were added prior to the passage through the first contact mass and an additional excess added to these gases prior to their introduction to the second or next contact mass, unless in the former case, the gas is cooled as by contact with cooled metallic surfaces after passing through each mass.

The patent to Ferguson 723,595 proposes broadly to solve the above difficulties. Burner gas containing sulphur dioxide is introduced to the first of three chambers with some air, and additional quantities of air are added into a mixing pipe connecting the several chambers and subsequent to the passage of the mixture through one of the chambers. This added air serves two functions, to wit, it cools down the highly heated gas resulting from its passage through the first series of contact masses, and, second, it permits of the operation of each of the converters with minimum quantities of excess air rather than adding the entire amount of air necessary prior to the first converter.

The Ferguson patent is open to certain objections from the standpoint of present day converters acceptable to the trade. The industry has accepted one type of apparatus in which the converter comprises but a single shell or casing, and within which are located spaced apart perforated shelves upon which catalytic material is supported. The mass of catalytic material on any one shelf is insufficient to fill the entire space between shelves so that as opposed to the showing of this patent, there is a considerable distance between the top of any contact mass and the next shelf, in the direction of gas flow. Actual operations under commercial conditions have demonstrated that the latter arrangement produces a much greater efficiency of conversion.

The Ferguson patent proposes to admix this air within short lengths of pipe connected between converter chambers. In those converter systems using but a single chamber, the Ferguson arrangement cannot be embodied therein.

The present day converter systems for the production of sulphuric acid find it necessary either to embed in the contact material heat exchange devices or to insert such devices between contact chambers in order to maintain the flowing gas within the limited temperature range at which conversion proceeds smoothly and efficiently.

It is, therefore, the principal object of the present invention to devise a converter system which will permit of the maintenance of the gases within the desired conversion temperature range, in a manner specifically different from Ferguson and without the use of the expensive and not altogether satisfactory heat exchange devices at present adopted as standard. This consequently lowers the initial and maintenance cost of the equipment.

Another important object of the invention is the provision in such a system of means whereby the added air and hot sulphur-bearing gases may be thoroughly and efficiently mixed prior to their passage to the next contact mass.

The invention in its broadest aspect contemplates the mixing of one gas with another, where that other comprises a flowing stream of a comparatively large cross sectional area, while traveling in a forward direction a comparatively short distance. In its preferred form, the invention contemplates the introduction of this added gas into the flowing stream of another gas tangentially thereof, so as to produce a swirling or turbulent action, and the subsequent passage of these two gases in a circuitous path through an aperture, the width of which is many times its height. This passage of the two gases through this small aperture causes intimate contact between the two with resultant efficient mixing and commingling. At the same time, where the oncoming gases are comparatively hot and the added gases are comparatively cool, a heat transfer takes place so that the desired temperature may be obtained by suitably proportioning the amounts of the two gases.

As applied to a sulphuric acid converter, the invention comprises the provision of a single casing or shell within which is located a series of spaced apart perforated shelves with contact material on these shelves in such quantity as to provide a substantial space between the top of any contact mass and the next shelf in the direction of gas flow. Means are provided for supplying sulphur dioxide gases to the bottom of the first of this series of shelves, and additional means are provided for introducing air into the space between contact masses, tangentially of the shell. Means are also provided beyond the air inlet in the direction of gas flow, comprising a series of baffles which form in effect an aperture, the width of which is many times its height, through which the on-coming sulphur-bearing gases and admixed air pass in a circuitous path, with consequent efficient mixing and commingling. The invention further contemplates the method of operating such a device.

The invention further includes the novel arrangement, combination and construction of parts and the method of operating the same, more fully hereinafter described and shown in the accompanying drawing.

In the drawing:

Fig. 1 shows a diagrammatic layout of a sulphuric acid contact apparatus and associated mechanism, in which the former is shown in some detail.

Fig. 2 is a sectional plan view along the line 2—2 of Fig. 1.

Fig. 3 is a fragmentary sectional elevation showing the interior arrangement of the contact apparatus.

Referring now with particularity to the drawing, and as applying the invention to an apparatus for the production of sulphuric anhydride, hot sulphur dioxide gases containing some air are produced in any desired equipment, and pass to a waste heat boiler for the purpose of abstracting a portion of the heat from the gases, which at this stage are far above efficient converter temperatures, with the production of steam, all of which is well known.

The cooled mixture of sulphur dioxide and air, within the conversion temperature range enters the contact apparatus through the pipe 1. The specific temperature below which the gases should be cooled will be determined by the character of the contact material used.

The converter proper comprises a shell or casing 2, preferably of a cylindrical nature, having a bottom 3 and a top 4 held together as by means of a series of rods 5 passing completely through the apparatus and secured at the upper and lower end by nuts 6 and 7.

Supported upon pipe spacers 8 surrounding the rods 5, is a lower perforated plate 9 adapted to support a mass of contact material 10. In the same manner, additional perforated shelves 9 are supported within the shell 2 at suitable intervals and also support their individual mass of contact material. It is to be noted that the quantity of contact material on any one shelf is such that there is a considerable space between the top of such mass and the bottom of the next succeeding shelf in the direction of gas flow.

Means are provided for supplying quantities of air or other oxygen available gases to the shell or casing 2 and into the space betwen contact masses. This means may conveniently consist of an air blower supplying air through the pipe 11 to a manifold 12 supplied with short lengths of pipe 13 terminating in elbows 14 within the shell, and arranged to eject the air tangentially thereinto. The short lengths of pipe 13 may be individually provided with suitable valves 15 so that the quantity and flow of incoming air may be controlled at various points. It is preferable that the point of introduction of this air be immediately adjacent the top of each of the contact masses.

In the space between the top of any contact mass and the shelf above, in the direction of gas flow, are arranged a series of baffles for causing commingling of the added air and the on-coming gases before passing through a subsequent contact mass. These baffles may conveniently consist of an intermediate imperforate circular disc or plate 16 supported upon the necessary spacers 17, the plate 16 having hung therefrom a lower annular baffle 18 and having mounted thereon an upper dished baffle 19, the parts 16, 18 and 19 being connected together by means of spacers 20 through which a bolt 21 passes, the three being secured in place by means of nuts 22.

As shown, it is desirable that the lower baffle 18 be arranged directly above the air inlets 14 and extending out toward the center of the apparatus beyond the same so that as the air enters tangentially, a swirling action may be secured and this air will spill over the inner edge of the annular baffle 18 to the space between the baffle and the imperforate plate 16. It is desirable that these two parts be spaced apart in such relation that a slit or aperture is provided, the width of which is many times its height. This arrangement causes the on-coming gases and the entering air to efficiently contact and commingle with each other. From this point the gases pass upwardly around the outer periphery of the imperforate plate or disc 16, between the latter element and the dished baffle 19 and through the next perforate plate and its contact mass. It has been found that where the upper baffle 19 is dished as shown, there is an efficient distribution of this mixed gas over the entire area of the space between contact masses. In order that the space directly adjacent the wall of the shell 2 may receive its share of the gases, the baffles 19 are spaced slightly from the wall thereof, which permits a certain amount of leakage past them.

From the above, it will be seen that the desired amount of air may be introduced into the on-coming gases as they leave each of the contact masses. From this point the two gases pass through the mixing device comprising the series of baffles, which not only causes efficient and thorough mixing of the gases, but permits at this point a heat transfer to take place, with the result that the mixed gases passing toward the next perforated plate and its contact mass have been cooled to within the proper conversion temperature range. This operation is repeated and additional air added as desired in order to supply the proper proportions of air and SO₂, and the conversion product passes out of the port 23 for further treatment as desired.

It is to be noted that this arrangement provides for an extreme flexibility of control in the temperature and proportions of gases passing to any contact mass. This constitutes a very important feature of the invention, which has not been possible heretofore.

It will also be seen that the mixing baffles cause an intimate commingling of the two gases, which is an extremely difficult problem, particularly in a converter where its diameter is frequently as great as 10 ft., while the space between the top of any contact mass and the bottom of the next perforated plate in the direction of gas flow, is not over 1 ft., and any mixing or heat transfer which takes place must be done within this short directional flow dimension.

While the invention has been shown and described with particular reference to a specific apparatus and the production of sulphuric anhydride, yet obviously it is not to be limited thereto nor to the particular instrumentalities herein shown and described, but the invention is to be construed broadly and limited only by the scope of the claims.

I claim:

1. A method of mixing one gas with a moving body of another, which consists in introducing the first gas to the body of the second tangentially thereof, so as to produce a swirling action, and subsequently passing the two gases through an aperture, the width of which is many times greater than its height, to cause mixing and commingling of the two gases.

2. A method of mixing air with a moving body of hot SO₂, which consists in introducing the air to the body of SO₂ tangentially so as to produce a swirling action, and subsequently passing the mixture of SO₂ and air in a circuitous path through an aperture, the width of which is many times greater than its height.

3. A method of operating a contact converter for the conversion of SO₂ to SO₃, where the gases pass successively through a series of contact masses, which consists in passing a mixture of air and SO₂ through one of said masses, subsequently introducing relatively cool air to said gas, passing the mixture through an aperture, the width of which is many times greater than its height, whereby the gas and added air are thoroughly commingled and the gas is cooled, and uniformly redistributing the commingled and cooled mixture for passage to another contact mass.

4. A method of operating a contact converter for the conversion of SO₂ to SO₃, where the gases pass successively through a series of contact masses, which consists in passing a mixture of air and SO₂ through one of said masses, subsequently introducing relatively cool air to said gas, passing the mixture through an aperture, the width of which is many times greater than its height, whereby the gas and added air are thoroughly commingled and the gas is cooled, passing the commingled and cooled mixture to another contact mass, and repeating the air addition in the same manner prior to the passage of the gas stream through each subsequent contact mass.

5. A contact converter comprising a shell, a series of perforated spaced apart shelves therein, a contact mass on each shelf spaced from the shelf above, means to introduce air from outside the shell into the space between shelves, and means beyond the air introduction means in the direction of gas flow in addition to the shelves and their contact masses, to cause commingling of the on-coming gas and the added air.

6. A contact converter comprising a shell, a series of perforated spaced apart shelves therein, a contact mass on each shelf spaced from the shelf above, a gaseous reactant inlet between shelves, an annular baffle immediately above the reactant inlet, an imperforate plate above the baffle of less diameter than the shell whereby the gas from the lower contact mass and the added gaseous reactant pass between the baffle and the plate and between the plate periphery and the shell before reaching the contact mass above.

7. A contact converter comprising a shell, a series of perforated spaced apart shelves therein, a contact mass on each shelf spaced from the shelf above, a gaseous reactant inlet between shelves, an annular baffle immediately above the reactant inlet, an imperforate plate above the baffle of less diameter than the shell, the plate being in close proximity to the baffle, whereby the gas from the lower contact mass and the added gaseous reactant pass between the baffle and the plate and between the plate periphery and the shell before reaching the contact mass above.

8. A contact converter comprising a shell, a series of perforated spaced apart shelves therein, a contact mass on each shelf spaced from the shelf above, a gaseous reactant inlet between shelves, an annular baffle immediately above the reactant inlet, an imperforate plate above the baffle of less diameter than the shell and a second annular baffle immediately above the plate, whereby the gas from the lower contact mass and the added gaseous reactant pass through a circuitous path before reaching the contact mass above.

9. A contact converter comprising a shell, a series of perforated spaced apart shelves therein, a contact mass on each shelf spaced from the shelf above, a gaseous reactant inlet between shelves, an annular baffle immediately above the reactant inlet, an imperforate plate above the baffle of less diameter than the shell and a second dished annular baffle immediately above the plate, whereby the gas from the lower contact mass and the added gaseous reactant pass through a circuitous path before reaching the contact mass above.

10. A contact converter comprising a shell, a series of perforated spaced apart shelves therein, a contact mass on each shelf spaced from the shelf above, a gaseous reactant inlet between shelves, an annular baffle immediately above the reactant inlet, an imperforate plate above the baffle of less diameter than the shell and a second annular baffle immediately above the plate, the baffles being in close proximity to the plate, thus forming an aperture of great width as compared to its height, and a circuitous path whereby the gas from the lower contact mass and the added gaseous reactant pass through this circuitous path before reaching the contact mass above.

11. A contact converter comprising a shell, a series of perforated spaced apart shelves therein, a contact mass on each shelf spaced from the shelf above, a gaseous reactant inlet between shelves, an annular baffle immediately above the reactant inlet, an imperforate plate above the baffle of less diameter than the shell and a second annular baffle immediately above the plate, the baffles being in close proximity to the plate, thus forming an aperture of great width as compared to its height, and a circuitous path, whereby the gas from the lower contact mass and the added gaseous reactant pass through this circuitous path before reaching the contact mass above, both of the baffles being supported by the plate.

WILLIAM L. SPALDING.